United States Patent [19]

Ive et al.

[11] Patent Number: 4,607,367

[45] Date of Patent: Aug. 19, 1986

[54] CORRECTING ERRORS IN BINARY DATA

[75] Inventors: John G. S. Ive; James H. Wilkinson, both of Basingstoke, United Kingdom

[73] Assignee: Sony Corporation, Tokyo, Japan

[21] Appl. No.: 621,226

[22] Filed: Jun. 15, 1984

[30] Foreign Application Priority Data

Jul. 19, 1983 [GB] United Kingdom ............... 8319404

[51] Int. Cl.[4] .............................................. G06F 11/10
[52] U.S. Cl. .......................................... 371/37; 371/38
[58] Field of Search ..................... 371/37, 38, 39, 40, 371/50

[56] References Cited

U.S. PATENT DOCUMENTS

| | | | |
|---|---|---|---|
| 3,418,630 | 12/1968 | Van Duuren | 371/39 |
| 4,371,963 | 2/1983 | Edwards | 371/50 |
| 4,375,100 | 2/1983 | Tsuji | 371/50 |
| 4,467,373 | 8/1984 | Taylor | 371/38 |
| 4,498,178 | 2/1985 | Ohhashi | 371/38 |
| 4,525,838 | 6/1985 | Patel | 371/38 |

Primary Examiner—Michael R. Fleming
Attorney, Agent, or Firm—Lewis H. Eslinger; Alvin Sinderbrand

[57] ABSTRACT

A method of correcting errors in binary data which may represent a digital television signal, comprises assembling the data into a plurality of first blocks, each first block comprising a first plurality of, say sixty, data words and a second plurality of, say six, check words and further assembling the first blocks into arrays of first blocks and deriving first and second check blocks for each array of the first blocks. Each check word is derived in dependence on all the data words in the first block and each other check word in the first block. One check word may be derived by modulo-2 addition and the remaining check words may be derived by respective primitive polynomial generators. The first check block is derived by modulo-2 addition and the second check block is derived by a primitive polynomial generator.

11 Claims, 21 Drawing Figures

CORRECTING ERRORS IN BINARY DATA

BACKGROUND OF THE INVENTION

1. Field of the Invention

This invention relates to methods of and apparatus for correcting errors in binary data, and particularly, but not exclusively, to methods of and apparatus for correcting errors in digital television signals after recording and reproduction.

2. Description of the Prior Art

It is now quite common for analog signals, such as audio or television signals, to be put into digital form, for example using pulse code modulation, for transmission or for recording. It is also quite usual to add some check words to the coded data words before transmission or recording for use on reception or reproduction to detect and correct errors in the received or reproduced data words. Sometimes the check words are derived quite simply as, for example, in the case of simple parity check words and cyclic redundancy check words. However, such simple methods generally imply a relatively low level of error detection or correction capability, or alternatively that a relatively large number of check words are required to achieve a desired level of security against errors. As all such check words are additional to the data words, and therefore in a sense redundant, more sophisticated methods of generating the check words, which result in an improved error detection and correction capability without undue increase in the number of check words required are in use particularly for digital television signals where the amount of data involved means that even without the addition of redundant words, very high bit rates have to be used. Examples of more sophisticated methods which have been used for digital television signals are various so-called b-adjacent codes, of which the Reed-Solomon code is a particular example, and the Bose-Chaudhuri-Hocquenghem code.

A common problem with prior methods of error detection and correction using check words is that if an error occurs in a check word, for example, during transmission or during recording and reproduction, this may mean that error detection and correction using that check word is impossible, or alternatively wrong detection and correction may occur. In the case of a digital television signal either of these eventualities may result in serious deterioration of a reproduced television picture.

Another problem is that while the use of such an error detection and correction method using check words may permit the detection and correction of up to several errors in the block of data words protected by those check words, the method does not provide adequate protection against a burst error involving a substantial sequence of data words and caused, for example, by a tape drop-out.

In our copending UK patent application No. 8222767 (Ser. No. 2 124 806) and No. 8235962 Ser. No. 2 132 393) we have proposed methods and apparatus for dealing with these problems. The present application is concerned with extensions to and modifications of these earlier methods and apparatus to permit still further improvements in the level of correction that can be achieved at least in some circumstances.

SUMMARY OF THE INVENTION

One object of the present invention is to provide a method of correcting errors in binary data and in which the problems referred to above are further alleviated.

Another object of the present invention is to provide apparatus for correcting errors in binary data which are not only dependent on associated data words but also on associated check words.

Another object of the present invention is to provide a method of correcting errors in binary data in which errors in check words can be detected and in some cases corrected.

According to the present invention there is provided a method of correcting errors in binary data, the method comprising assembling the data into a plurality of data blocks, each said data block comprising a first plurality of data words and a second plurality of check words, each said check word being derived in dependence on all said data words in said data block and each other said check word in said data block, and further assembling said data blocks into an array consisting of a plurality of said data blocks and deriving first and second check blocks for each said array.

According to the present invention there is also provided apparatus for correcting errors in binary data, the apparatus comprising means for assembling the data into a plurality of data blocks, each said data block comprising a first plurality of data words and a second plurality of check words, each said check word being derived in dependence on all said data words in said data block and each other said check word in said data block, and means for further assembling said data blocks into an array consisting of a plurality of said data blocks and for deriving first and second check blocks for each said plurality of data blocks.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
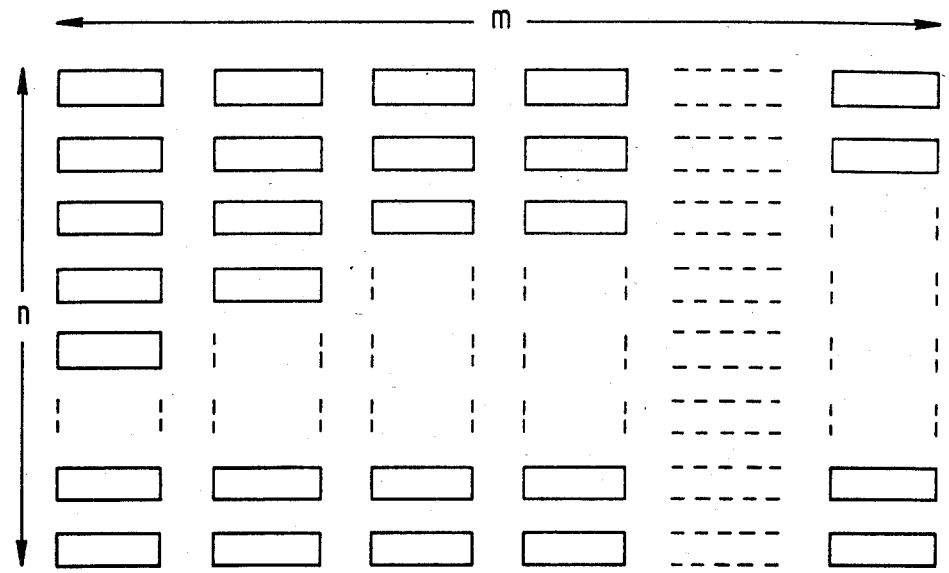
FIG. 1 indicates diagramatically a coding format for part of one field of a digital television signal.
Figure 2:
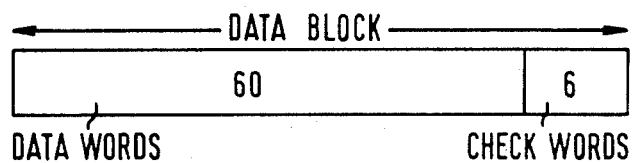
FIG. 2 indicates diagrammatically one data block from the format of FIG. 1.

Referring to FIG. 1, this shows a coding format applied to a digital television signal. Each horizontal line scan of an incoming analog television signal has, as a preliminary, been sampled a predetermined number of times and each of the resulting samples has been pulse code modulation coded into an 8-bit data word. The part of the format shown in FIG. 1 covers an array of m rows by n columns of data blocks where each data block consists, for example as shown in FIG. 2, of sixty 8-bit data words plus six 8-bit horizontal check words corresponding to those data words.

In one particular digital television system using two head pairs for recording, m is equal to eighteen and n is equal to thirty-six, where the first thirty-four of the thirty-six rows correspond to active samples and the final two rows consist of eighteen first and eighteen second vertical check blocks, which will be referred to in more detail below. Each row contains three horizontal lines of video. Hence each m×n array consists of 34×3=102 horizontal lines. Three arrays are required to make up one field of 306 lines. (312½ lines are contained in one field of a 625-line system, the difference of 6½ lines being taken from inactive regions of the picture, that is blanking lines.)

The particular system used in this example is a so-called 2:1:1 system applied to a component television signal in which the luminance component signal is sampled at 6.75 MHz and each colour difference component signal is sampled at 3.375 MHz. This results in a total 720 active samples per horizontal scan line or 13.5 megawords/second.

It will be appreciated that the invention can equally be applied to a so-called 4:2:2 system in which case the numbers given per horizontal line scan are doubled, and to composite television signals, and moreover the numbers given herein are merely by way of example.

As previously mentioned, the final two rows of each m×n array consist of first and second vertical check blocks each of which comprises sixty-six 8-bit vertical check words. The vertical check words in the first vertical check block are generated by bit-by-bit exclusive-OR (that is, modulo-2) addition of the individual bits of the vertically aligned data words in the first n−2 rows of the m×n array. The vertical check words of the second vertical check block are derived from the same data words but form a b-adjacent code which is preferably a Reed-Solomon code. The first and second vertical check blocks are generated in a manner to be described in more detail below, preferably before the horizontal check words have been added to the data blocks of data words in the m×n arrays and before any necessary synchronizing words have been added.

The method of coding outlined above and to be described in more detail below permits of various possibilities on decoding. This results from the fact that the six horizontal check words in each data block shown in FIG. 2 permit the detection and correction of at least two error words in the data block. Moreover, the first and second vertical check words in the final two rows of each column permit, for example, the detection and correction of a single error word in that column or the detection of two error words in that column.

Figure 3:
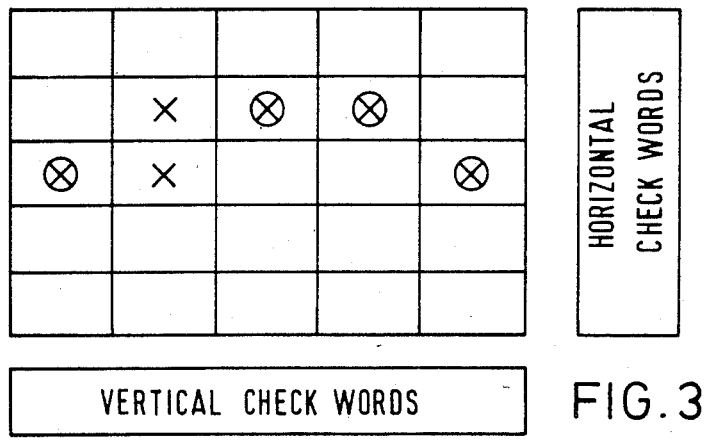
FIG. 3 indicates diagrammatically an array of data words.

Consider, for example, the array of data words indicated in FIG. 3 where the main rectangle represents five horizontal rows and five vertical columns of data words. The rectangle to the right indicates the horizontal check words and the rectangle below indicates the vertical check words. Further, suppose that the data words marked "X" are in error. One possible sequence of error detection on decoding is a three-step sequence first using the horizontal check words for correction. This first horizontal correction process corrects any single or double errors. Moreover, the horizontal code also detects to a high degree of accuracy whether the correction is successful. If so, then further correction of any data within that block by subsequent error correction stages is prevented from taking place. This procedure eliminates any possibility of wrongful correction by the vertical correction process. Then the vertical check words are used for correction but not further detection, and then the horizontal check words are used for correction and further detection. If that approach were used with the error pattern shown, then the initial use of the horizontal check words in the first horizontal correction process would not in fact result in any correction because there are too many errors, that is to say three errors, in the second and third horizontal rows. However, the subsequent use of the vertical check words would result in correction of the single error words in the first, third, fourth and fifth columns. Those corrected error words are shown ringed. It will then be seen that the next stage of error correction using the horizontal check words would result in the correction of the remaining error words in the second and third rows because there now only remains one error word in each of those rows. In this simple example it will be seen that all the error words are corrected by these three steps, but obviously this will not always be the case, and it may be that the second use of the horizontal check words will still leave some error words detected but uncorrected, and those words are flagged for subsequent concealment.

It will now be apparent that this method of coding permits of a range of different possibilities on decoding additional to the three-step sequence outlined above. Thus different or additional steps can be used, although generally it would probably not be advantageous to use more than three steps of error correction, because of the sharply decreasing number of error words which are in fact corrected by additional correction steps. Obviously there may be circumstances in which the density of errors is such that the only viable possibility is to flag all the data words in the m×n block for subsequent error correction or error concealment processes.

While for simplicity it will be considered in the present specification that successive data words in a data block represent successive samples along a horizontal scan line, in practice this is unlikely to be the case. The reason is that if the block contains an uncorrectable error pattern, then all the words of that block may be assumed to be in error even although some may still be correct. However, this is the prime method of error detection and this detection must be used before the concealment process. The chances of concealing such errors are substantially improved by dispersing them and it has therefore been previously proposed that after sampling the analog television signal and coding the samples, the resulting data words should be shuffled in order, for example using a random access memory (RAM) arrangement. Then, prior to decoding the data words, their order is de-shuffled using a complementary RAM arrangement.

Another previously proposed technique for improving error correction is interleaving, and that technique can also be used in the present error correction formats. The effect of interleaving is to spread errors, so that if a burst error occurs there is a greater probability of each of the individual word errors being corrected.

The method of generating the six horizontal check words of each data block will now be described. A particular feature of these horizontal check words is that they are generated not only in dependence on the sixty data words in the data block but also in dependence on each other. To assist understanding of this, some general theory of error correction coding and a known prior error correction code will first be discussed.

If one considers a sequence of binary digits, then an error can be sufficiently identified merely by its position. Thus if the position of the error bit is known the required correction is known because the bit can only have two values and the correct value must be the inverse of the actual value. If one considers a block of data words, that is a plurality of data words each consisting of a plurality of bits, then to identify an error sufficiently the position and the magnitude of the error need to be known.

Figure 4:
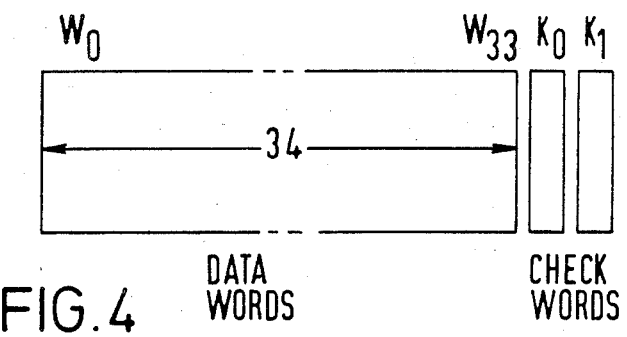
FIG. 4 indicates diagrammatically a block of data words with associated check words.

Referring to FIG. 4, consider a block of say thirty-four 8-bit data words $W_0$ to $W_{33}$. Each of the data words $W_0$ to $W_{33}$ represents in pulse code modulated form a sample level of an analog television signal, the sample range having 256 steps, that is $2^8$. Associated with the block are two 8-bit check words $K_0$ and $K_1$ to provide error correction of one 8-bit data word, by identifying the position of the word in error and the magnitude of the error. This might be considered as providing two simultaneous equations which are solved to find the two unknowns. For this to be possible two check words must each be derived in dependence on all the data words in the block, but in different ways, so as to ensure that they include independent information and hence the equations are soluble. A b-adjacent code is one way of obtaining this independence.

Figure 9A:
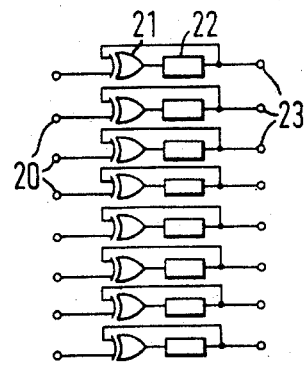
FIGS. 9A and 9B show in block form respective primitive polynomial generators for use in generating the check words of FIG. 6.

Thus in the example of FIG. 4, the first check word $K_0$ is derived by the simple modulo-2 addition of all thirty-four data words. That is:

$$K_0 = W_0 \oplus W_1 \oplus W_2 \oplus \ldots \oplus W_{33} \tag{1}$$

where $\oplus$ represents modulo-2 addition, achieved by the circuit of FIG. 9A.

Figure 9B:
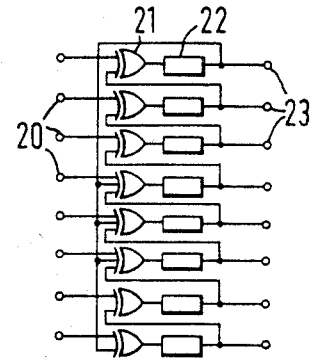
Figure 10:
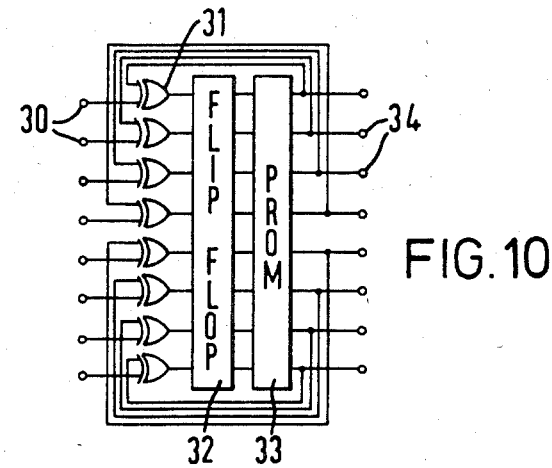
FIG. 10 shows in block form an alternative form of primitive polynomial generator for use in generating the check words of FIG. 8.

The second check word $K_1$ is derived using a primitive polynomial generator. Consider FIG. 5. The centre of the circle represents the 8-bit word 00000000. Around the circumference of the circle are 255 steps designated $\alpha^0, \alpha^1, \alpha^2, \ldots \alpha^{254}$ representing all the different non-zero patterns of an 8-bit code. The effect of the polynomial generator, which is conveniently formed as an 8-stage feedback shift register interconnected as shown in FIG. 9B, is to step an input data word clockwise around the circle when the shift register is clocked once. Thus if an 8-bit data word is stored in the shift register, the word may be considered as having been multiplied by $\alpha^0$, that is by one. If the shift register is then clocked once the word may be considered as having been multiplied by $\alpha^1$, and so on up to $\alpha^{254}$. One further clock brings the data word back to the original value. Because the polynomial is primitive any input 8-bit combination other than 00000000 supplied to the shift register will cycle in a predetermined manner through all the other possible combinations before returning to the original combination.

To derive the check word $K_1$, the data word $W_0$ is supplied to the inputs of the shift register, which is then clocked once. The data word $W_1$ is modulo-2 added and the shift register is clocked once again. The data word $W_2$ is modulo-2 added and the shift register is clocked once again. This is continued until finally the data word $W_{33}$ is modulo-2 added. The first few steps can be represented as follows:

$$(W_0 \cdot \alpha^1) \oplus W_1 \tag{2}$$

$$((W_0 \cdot \alpha^1) \oplus W_1)\alpha^1 \oplus W_2 \tag{3}$$

$$(((W_0 \cdot \alpha^1) \oplus W_1)\alpha^1 \oplus W_2)\alpha^1 \oplus W_3 \tag{4}$$

Expression (4) can be re-written:

$$W_0 \alpha^3 \oplus W_1 \alpha^2 \oplus W_2 \alpha^1 \oplus W_3 \alpha^0 \tag{5}$$

Finally therefore we have:

$$K_1 = W_0 \alpha^{33} \oplus W_1 \alpha^{32} \oplus W_2 \alpha^{31} \oplus \ldots \oplus W_{33} \alpha^0 \tag{6}$$

In matrix form equations (1) and (6) can be written:

$$\begin{bmatrix} K_0 \\ K_1 \end{bmatrix} = \begin{bmatrix} \alpha^0 \alpha^0 \alpha^0 \ldots \alpha^0 \\ \alpha^0 \alpha^1 \alpha^2 \ldots \alpha^{33} \end{bmatrix} \begin{bmatrix} W_{33} \\ W_{32} \\ W_{31} \\ \cdot \\ \cdot \\ \cdot \\ W_0 \end{bmatrix} \tag{7}$$

A method of decoding used to derive from the check words $K_0$ and $K_1$ information as to the position and magnitude of an error will now be described. If it is assumed that one of the data words $W_x$ is in error, for example after the block of data words $W_0$ to $W_{33}$ with the two associated check words $K_0$ and $K_1$ have been recorded and reproduced, then the error $E_x$ can be taken as being modulo-2 added to the recorded data word $W_x$ resulting in the reproduced error data word $W_x \oplus E_x$.

After reproduction, two syndromes $S_0$ and $S_1$ are generated. The syndrome $S_0$ is the modulo-2 sum of $K_0$ and $K'_0$, $K'_0$ being derived in a similar manner to $K_0$ but from the reproduced data words $W'_n$. Therefore:

$$S_0 = (K_0) \oplus (K'_0) = \tag{8}$$

$$\left\{ \sum_{n=0}^{33} W_n \right\} \oplus \left\{ \sum_{n=0}^{33} W'_n \right\} \oplus Ex = Ex$$

Thus if there is no error (Ex=0), the syndrome $S_0$ will be zero and if there is an error (Ex≠0), the syndrome $S_0$ is equal to the magnitude of the error Ex.

The syndrome $S_1$ is the modulo-2 sum of $K_1$ and $K'_1$, $K'_1$ being derived in a similar manner to $K_1$ but from the reproduced data words $W'_n$. Therefore:

$$S_1 = (K_1) \oplus (K'_1) = \tag{9}$$

$$\left\{ \sum_{n=0}^{33} W_n \alpha^{33-n} \right\} \oplus \left\{ \sum_{n=0}^{33} W'_n \alpha^{33-n} \right\} \oplus Ex \cdot \alpha^{33-x}$$

$$= Ex \cdot \alpha^{33-x}$$

Figure 5:
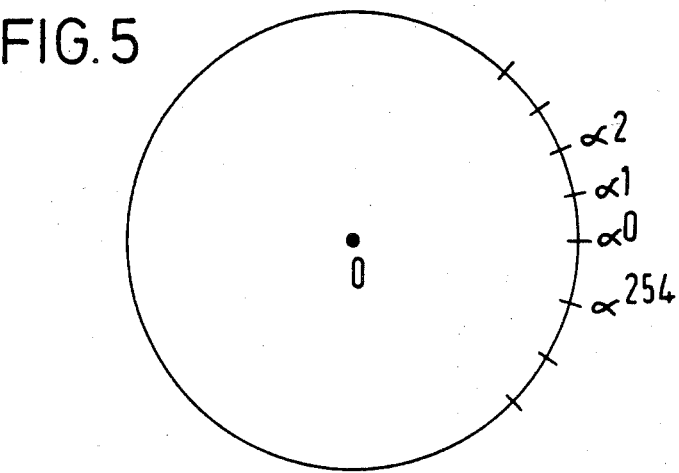
FIG. 5 illustrates diagrammatically the operation of a primitive polymonial generator.

Thus if there is no error (Ex=0) the syndrome $S_1$ will be zero and if there is an error (Ex≠0), the syndrome $S_1$ is equal to the magnitude of the error Ex stepped back to the position of the error, that is by $33-x$ steps, around the circle of FIG. 5.

Thus if the syndrome $S_1$ is stepped back $x-33$ steps it will become equal to the magnitude of the error Ex, that is, equal to the syndrome $S_0$:

$$S'_1 = S_1 \cdot \alpha^{x-33} = Ex \cdot \alpha^0 = S_0 \tag{10}$$

To find the position of the error data word $W_x$, a Chien search is performed in which $S_1$ is repeatedly multiplied by $\alpha^{-1}$, that is it is stepped successively around the circle of FIG. 5 in an anti-clockwise direction, testing for $S'_1 = S_0$ at each step. When this condition is satisfied the position of the error has been found.

As a modification to the latter part of this method the syndrome $S_1$ can initially be multiplied by $\alpha^{-33}$. Thus equation (9):

$$S_1 = Ex \cdot \alpha^{33-x} \tag{9}$$

is modified to give a new syndrome $S_1$, where:

$$S'_1 = Ex \cdot \alpha^{-x} \tag{10'}$$

The Chien search can then be repeatedly performed by multiplying by $\alpha^1$ and testing for $S_1 = S_0$ at each step. The advantages of this modification are that it avoids the need for reverse stepping, so a primitive polynomial generator of the same configuration as used in the coder can be used, and it requires only one delay store, rather than two first-in last-out stores.

The above-described error correcting code will correct a single error without fail. Thus if the error is in one of the data words $W_0$ to $W_{33}$, the check words $K_0$ and $K_1$ will enable the magnitude and the position of the error to be determined. Moreover, if the error is in one of the check words $K_0$ or $K_1$, then one of the syndromes $S_0$ or $S_1$ will be zero and the other will be non-zero, thus indicating that the error is in one of the check words $S_0$ or $S_1$ and the data words $W_0$ to $W_{33}$ are error-free.

However, it will be seen that problems arise with this error correcting code in all cases where there are multiple errors, that is two or more errors. In such cases it would be advantageous if the error correcting code at least had some error detecting capability even in the cases where it could not effect error correction, so that remaining errors can be flagged for possible subsequent correction or concealment. Also in such cases it is important to reduce the probability of failure, that is where in the presence of two or more errors a wrong correction is made resulting in data which is in fact valid being invalidated. For a so-called perfect code, an example of which is the sngle error correcting Hamming code, the number of addresses identifiable by the check words is equal to the number of addresses where an error may occur. Inevitably therefore if there is more than one error, the Hamming code will assume a single error and make a wrong correction. For non-perfect codes, it is necessary to use that part of the code which is not used for correction, as a means of detecting as best possible all error patterns outside the correction requirement of the code.

The code described above with reference to FIG. 4 is not perfect in this sense because the two syndromes $S_0$ and $S_1$ can assume $2^{16}-1$ different non-zero patterns whereas the total possible number of error patterns is $2^8-1$, that is 255 (the number of possible word patterns) times 36 (the number of words). Clearly:

$2^{16}-1$ is greater than 255 times 36 and this would still be true if the total number of words including the check words were increased to the maximum possible 255. This means that in theory at least some of the residual patterns are available for detection of multiple errors involving more than a single word. To achieve this it is necessary to ensure that as many as possible of these residual patterns do not occur in correcting single errors.

By calculating the probabilities of failure associated with multiple errors it becomes apparent that the most troublesome situation is where there is an error in a check word, as in that case the code cannot distinguish whether this represents a single error in the check word or a multiple error in the data words. If the system assumes that it is a single error in the check word, then there is a significant probability of a data word block containing at least two errors being passed as valid, while if the system assumes that there are two errors in the data block there is a significant probability of valid data word blocks being treated as invalid. The particular difficulty with errors in check words is that the other check word cannot give any information concerning the error, because the two check words are not related to each other in any way except through the data words.

Figure 6:
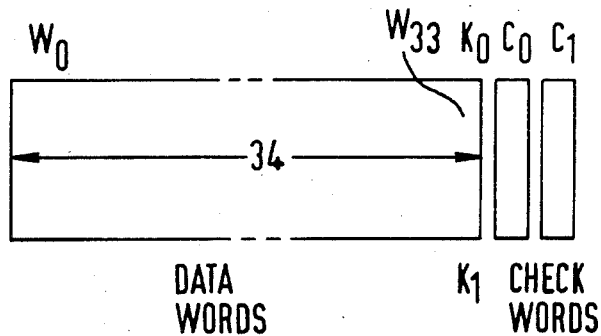
FIG. 6 indicates diagrammatically a further block of data words with associated check words.

A simplified version of the error correcting code used for generating the check words of each of the data blocks of FIG. 2 will now be described with reference to FIG. 6. As with FIG. 4, this shows a block of thirty-four 8-bit data words $W_0$ to $W_{33}$. Associated with the block are two 8-bit check words $C_0$ and $C_1$. Basically these check words $C_0$ and $C_1$ are derived in the same way as the check words $K_0$ and $K_1$ of FIG. 4. That is, the check word $C_0$ is formed as a modulo-2 sum and the check word $C_1$ is formed using a primitive polynomial generator, but whereas the check words $K_0$ and $K_1$ of FIG. 4 are both in effect related to the position 33 in the block, the check words $C_0$ and $C_1$ are in effect related to the position 35. In other words, whereas the check words $K_0$ and $K_1$ of FIG. 4 are derived in dependence on the data words up to and including the last data word $W_{33}$ in the position 33, the check words $C_0$ and $C_1$ of FIG. 6 are derived in dependence on the data words up to and including the last data word $W_{33}$ in the position 33 plus the check words $C_0$ and $C_1$ themselves in the positions 34 and 35.

Thus each of the check words $C_0$ and $C_1$ contains information concerning the other check word, so that in decoding, the check words $C_0$ and $C_1$ can be treated exactly as if they were data words, and if there is a single error the magnitude and position of the error can be determined even if the error is in one of the check words $C_0$ or $C_1$.

The problem, of course, is to generate the check words $C_0$ and $C_1$, and this is probably best explained mathematically. Equations (1) and (6) show how the check words $K_0$ and $K_1$ of FIG. 4 could be derived from the data words $W_0$ to $W_{33}$:

$$K_0 = W_0 \oplus W_1 \oplus W_2 \oplus \ldots \oplus W_{33} \qquad (1)$$

$$K_1 = W_0 \alpha^{33} \oplus W_1 \alpha^{32} \oplus W_2 \alpha^{31} \oplus \ldots \oplus W_{33} \alpha^0 \qquad (6)$$

Thus in the situation of FIG. 6, given the thirty-four data words $W_0$ to $W_{33}$, two intermediate words $K_0$ and $K_1$ related to the position 33 can be derived. Moreover, from FIG. 6 is will be seen that:

$$C_0 \cdot \alpha^0 = K_0 \alpha^0 \oplus C_1 \alpha^0 \qquad (11)$$

and $$C_1 \alpha^0 = K_1 \alpha^2 \oplus C_0 \alpha^1 \qquad (12)$$

Equations (11) and (12) can be re-written:

$$K_0 = C_0 \oplus C_1 \qquad (13)$$

and $$K_1 = C_0 \alpha^{-1} \oplus C_1 \alpha^{-1} \qquad (14)$$

in matrix form this becomes:

$$\begin{bmatrix} K_0 \\ K_1 \end{bmatrix} = \begin{bmatrix} \alpha^0 & \alpha^0 \\ \alpha^{-1} & \alpha^{-2} \end{bmatrix} \begin{bmatrix} C_0 \\ C_1 \end{bmatrix} \qquad (15)$$

The centre matrix is in fact a Vandemonde determinant, so it always has a real inverse, and equation (15) can be solved for $C_0$ and $C_1$. In fact the solution when employing a primitive polynomial generator of the form shown in FIG. 9B represented by the equation:

$$X^8 = X^4 \oplus X^3 \oplus X^2 \oplus X^0 \qquad (16)$$

is:

$$\begin{bmatrix} C_0 \\ C_1 \end{bmatrix} = \begin{bmatrix} \alpha^{230} & \alpha^{232} \\ \alpha^{231} & \alpha^{232} \end{bmatrix} \begin{bmatrix} K_0 \\ K_1 \end{bmatrix} \qquad (17)$$

so the required check words $C_0$ and $C_1$ can readily be determined, most conveniently by using a programmable read-only memory (PROM) as a look-up table.

Figure 7:
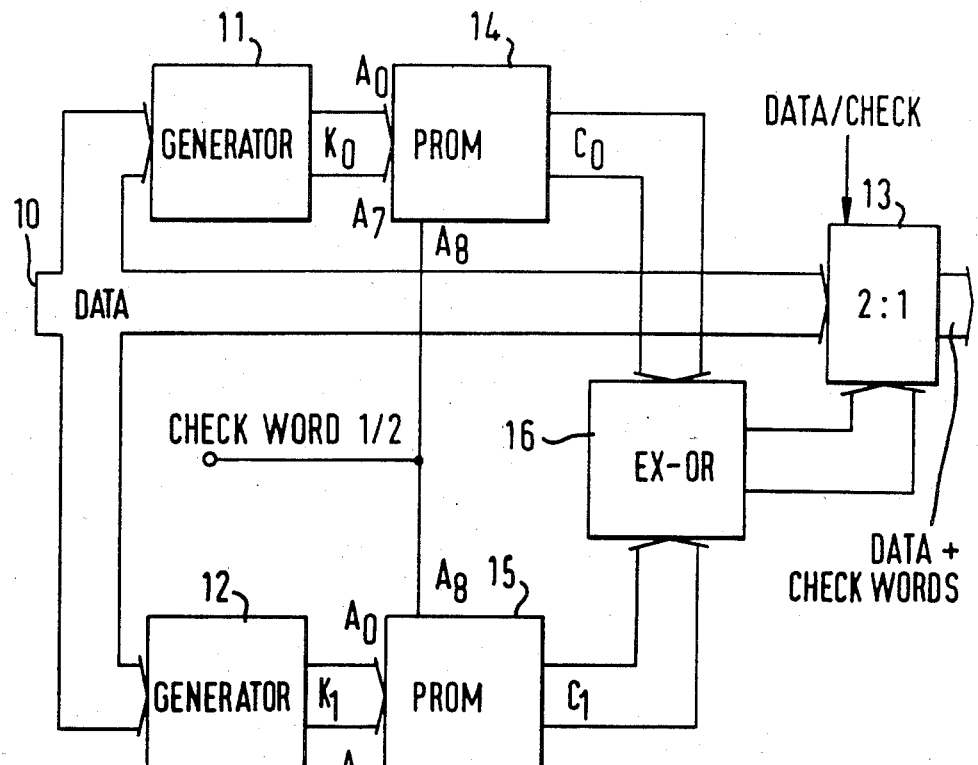
FIG. 7 shows in block form a circuit for generating horizontal check words in an encoder.

FIG. 7 shows in block schematic form a circuit for generating the check words $C_0$ and $C_1$. The incoming data words $W_0$ to $W_{33}$ are supplied by way of an input 10 to first and second primitive polynomial generators 11 and 12 which derive the intermediate words $K_0$ and $K_1$ respectively, and also to a 2:1 selector 13. The intermediate word $K_0$ derived by the primitive polynomial generator 11 is supplied to a (512×8) PROM 14 and the intermediate word $K_1$ derived by the primitive polynomial generator 12 is supplied to a (512×8) PROM 15. The intermediate words $K_0$ and $K_1$ are supplied to the input terminal $A_0$ to $A_7$ of the PROMs 14 and 15 respectively and to the input terminals $A_8$ are supplied switching signals to cause the PROMs 14 and 15 to operate alternately to derive the check words $C_0$ and $C_1$, which are supplied by way of an exclusive-OR circuit 16 to the 2:1 selector 13. The output of the 2:1 selector 13 is formed by the data words $W_0$ to $W_{33}$ with the associated check words $C_0$ and $C_1$.

In the decoder the procedure is basically as described above for the prior method of FIG. 4 but with the difference that instead of deriving the check words merely from the incoming data words, both the incoming data words and the incoming check words are used, and in consequence the syndromes are derived directly. If there are no errors in the check words then both syndromes are zero. If both the syndromes are non-zero then the assumption is that there is a single error, and the magnitude and position of this error can be found by a Chien search. It may be, of course, that this Chien search reveals that the single error is in one of the check words, in which case the data words are simply passed as valid, with no correction being necessary. If one syndrome is zero and the other is non-zero, then there is more than one error. An improved method of decoding will be described below.

Figure 8:
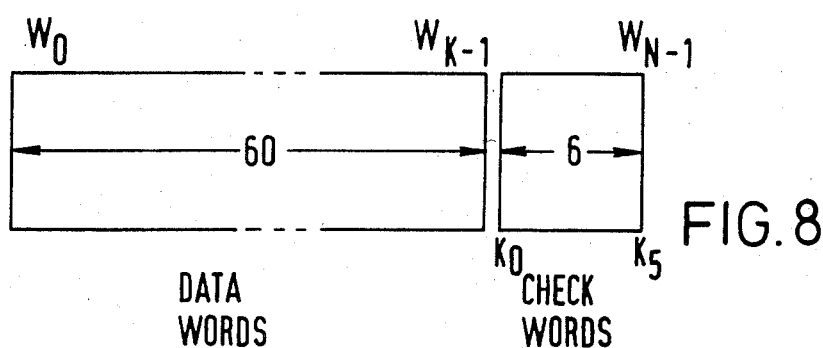
FIG. 8 indicates diagrammatically a still further block of data words with associated check words.

The example which has just been given is of course a very simple one, and does not have sufficient check information for a practical digital video tape recorder. The method used for the data format of FIGS. 1 and 2 will now be described with reference to FIGS. 8 to 11. FIG. 8 indicates diagrammatically the sixty data words $W_0$ to $W_{59}$ ($W_{K-1}$) of a data block, with which are associated the six horizontal check words. The use of six horizontal check words with sixty data words gives a level of redundancy which has been used in several prior methods, but the number of data words could be different, with appropriate changes to the formats of FIGS. 1 and 2, so long as the number $W_{K-1}$ lies within the range 1 to 249 inclusive.

Basically the data words with the six associated horizontal check words form a modified 3-error correcting Reed-Solomon code. It is not required to use the full 3-error correcting capability to correct errors within the data block and the associated horizontal check words, and this capability may be used in the first step of error correction on decoding merely to correct one or two errors in the data words and the associated check words.

In a conventional Reed-Solomon code the six check words would be derived from the matrix of extension field elements as follows:

$$\begin{bmatrix} K_0 \\ K_1 \\ K_2 \\ K_3 \\ K_4 \\ K_5 \end{bmatrix} = \begin{bmatrix} \alpha^0 & \alpha^0 & \alpha^0 & \ldots \\ \alpha^0 & \alpha^1 & \alpha^2 & \ldots \\ \alpha^0 & \alpha^2 & \alpha^4 & \ldots \\ \alpha^0 & \alpha^3 & \alpha^6 & \ldots \\ \alpha^0 & \alpha^4 & \alpha^8 & \ldots \\ \alpha^0 & \alpha^5 & \alpha^{10} & \ldots \end{bmatrix} \begin{bmatrix} W_{K-1} \\ W_{K-2} \\ W_{K-3} \\ \cdot \\ \cdot \\ \cdot \\ W_0 \end{bmatrix} \qquad (18)$$

where $K_0$ to $K_5$ represents the six check words respectively, and $W_0$ to $W_{K-1}$ represent the data words.

The check words $K_0$ to $K_5$ can be generated from the data words $W_0$ to $W_{K-1}$ using primitive polynomial generators as referred to above. The particular primitive polynomial generators required to generate the check words $K_0$ and $K_1$ are illustrated in block diagrammatic form in FIGS. 9A and 9B. Looking, for example, at FIG. 9B, each of the primitive polynomial generators comprises eight input terminals 20 each connected to one input of a respective exclusive-OR circuit 21, the output of which is connected to the input of a respective shift register stage 22, each having an output connected to a respective output terminal 23. Feedback connections as appropriate to generate the required polynomial also extend from the outputs of the shift register stages 22 to respective inputs of the exclusive-OR circuits 21.

Although the remaining four polynomial generators can be made in a similar way they involve rather complex interconnections and a substantial amount of hardware. As a preferred alternative, therefore, a primitive polynomial generator incorporating a PROM as shown in block form in FIG. 10 can be used. This primitive polynomial generator comprises input terminals 30 each connected to one input of a respective exclusive-OR circuit 31, the outputs of which are connected to an 8-way D-type flip-flop 32 having eight outputs respectively connected to eight inputs of a PROM 33 having eight outputs respectively connected to eight output terminals 34. Feedback connections also extend from the outputs of the PROM 33 to respective inputs of the exclusive-OR circuits 31. The primitive polynomial which is actually generated by this primitive polynomial generator depends on the programming of the PROM 33, and the same basic configuration can therefore be used to form the six primitive polynomial generators required for generating the check words $K_0$ to $K_5$.

In a conventional Reed-Solomon code, the check words $K_0$ to $K_5$ would be associated with the data block with no further processing. However, as described above, this does not provide effective security against errors in the check words themselves, particularly where there is one error in a check word and one in a data word. As described above, therefore, the check words are modified so that each check word is dependent not only on all the data words but also on all the other check words.

Then if K is the number of data words in the block and N is the block length, the first stage check words are generated from the following matrix:

$$\begin{bmatrix} K_0 \\ K_1 \\ K_2 \\ K_3 \\ K_4 \\ K_5 \end{bmatrix} = \begin{bmatrix} \alpha^0 \alpha^0 \alpha^0 \ldots \alpha^0 \\ \alpha^0 \alpha^1 \alpha^2 \ldots \alpha^{(K-1)} \\ \alpha^0 \alpha^2 \alpha^4 \ldots \alpha^{2(K-1)} \\ \alpha^0 \alpha^3 \alpha^6 \ldots \alpha^{3(K-1)} \\ \alpha^0 \alpha^4 \alpha^8 \ldots \alpha^{4(K-1)} \\ \alpha^0 \alpha^5 \alpha^{10} \ldots \alpha^{5(K-1)} \end{bmatrix} \begin{bmatrix} W_{K-1} \\ W_{K-2} \\ . \\ . \\ W_1 \\ W_0 \end{bmatrix} \quad (19)$$

In other words, $K_0$ to $K_5$ are the check words which would conventionally be associated with the block. If we now define the check words which are actually to be used as $C_0$ to $C_5$ then the check words C and K are related by the following equations:

$$\alpha^0 C_0 = \alpha^0 K_0 \oplus \alpha^0 C_1 \oplus \alpha^0 C_2 \oplus \alpha^0 C_3 \oplus \alpha^0 C_4 \oplus \alpha^0 C_5$$

$$\alpha^4 C_1 = \alpha^6 K_1 \oplus \alpha^5 C_0 \oplus \alpha^3 C_2 \oplus \alpha^2 C_3 \oplus \alpha^1 C_4 \oplus \alpha^0 C_5$$

$$\alpha^6 C_2 = \alpha^{12} K_2 \oplus \alpha^{10} C_0 \oplus \alpha^8 C_1 \oplus \alpha^4 C_3 \oplus \alpha^2 C_4 \oplus \alpha^0 C_5$$

$$\alpha^6 C_3 = \alpha^{18} K_3 \oplus \alpha^{15} C_0 \oplus \alpha^{12} C_1 \oplus \alpha^9 C_2 \oplus \alpha^3 C_4 \oplus \alpha^0 C_5$$

$$\alpha^4 C_4 = \alpha^{24} K_4 \oplus \alpha^{20} C_0 \oplus \alpha^{16} C_1 \oplus \alpha^{12} C_2 \oplus \alpha^8 C_3 \oplus \alpha^0 C_5$$

$$\alpha^0 C_5 = \alpha^{30} K_5 \oplus \alpha^{25} C_0 \oplus \alpha^{20} C_1 \oplus \alpha^{15} C_2 \oplus \alpha^{10} C_3 \oplus \alpha^5 C_4 \quad (20)$$

The equations (20) must be solved for the check words $C_0$ to $C_5$. The equations can be rearranged in determinant form as follows:

$$\begin{bmatrix} K_0 \\ K_1 \\ K_2 \\ K_3 \\ K_4 \\ K_5 \end{bmatrix} = \begin{bmatrix} \alpha^0 & \alpha^0 & \alpha^0 & \alpha^0 & \alpha^0 & \alpha^0 \\ \alpha^{-1} & \alpha^{-2} & \alpha^{-3} & \alpha^{-4} & \alpha^{-5} & \alpha^{-6} \\ \alpha^{-2} & \alpha^{-4} & \alpha^{-6} & \alpha^{-8} & \alpha^{-10} & \alpha^{-12} \\ \alpha^{-3} & \alpha^{-6} & \alpha^{-9} & \alpha^{-12} & \alpha^{-15} & \alpha^{-18} \\ \alpha^{-4} & \alpha^{-8} & \alpha^{-12} & \alpha^{-16} & \alpha^{-20} & \alpha^{-24} \\ \alpha^{-5} & \alpha^{-10} & \alpha^{-15} & \alpha^{-20} & \alpha^{-25} & \alpha^{-30} \end{bmatrix} \begin{bmatrix} C_0 \\ C_1 \\ C_2 \\ C_3 \\ C_4 \\ C_5 \end{bmatrix} \quad (21)$$

Again, this is a Vandermonde determinant which always has a real inverse, and results in the following solution:

$$\begin{bmatrix} C_0 \\ C_1 \\ C_2 \\ C_3 \\ C_4 \\ C_5 \end{bmatrix} = \begin{bmatrix} \alpha^{229} & \alpha^{89} & \alpha^{142} & \alpha^{146} & \alpha^{101} & \alpha^{249} \\ \alpha^{88} & \alpha^{62} & \alpha^7 & \alpha^{76} & \alpha^{170} & \alpha^{107} \\ \alpha^{140} & \alpha^6 & \alpha^4 & \alpha^{40} & \alpha^{82} & \alpha^{158} \\ \alpha^{143} & \alpha^{74} & \alpha^{39} & \alpha^{10} & \alpha^{19} & \alpha^{160} \\ \alpha^{97} & \alpha^{167} & \alpha^{80} & \alpha^{18} & \alpha^{80} & \alpha^{113} \\ \alpha^{244} & \alpha^{103} & \alpha^{155} & \alpha^{158} & \alpha^{112} & \alpha^4 \end{bmatrix} \begin{bmatrix} K_0 \\ K_1 \\ K_2 \\ K_3 \\ K_4 \\ K_5 \end{bmatrix} \quad (22)$$

Figure 11:
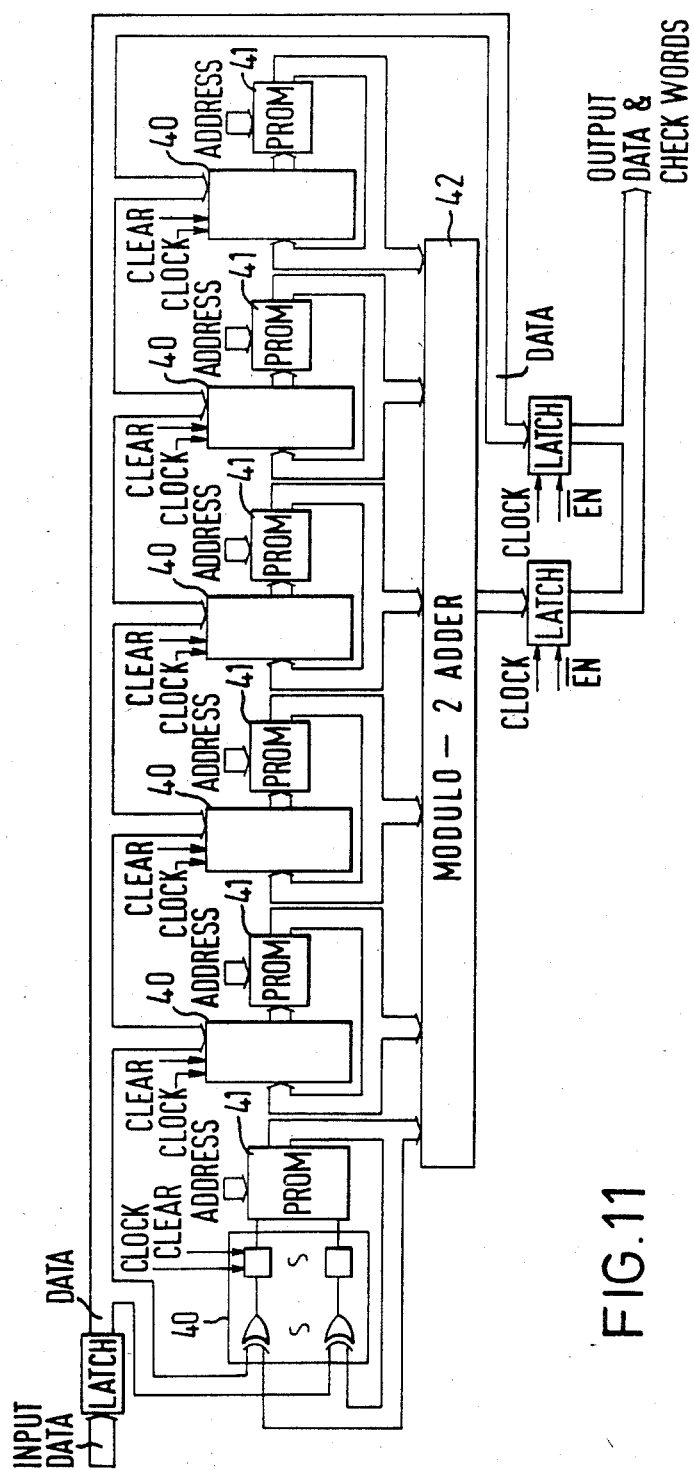
FIG. 11 shows in block form a code generator for use in an encoder.

The implementation of this determinant is, in practice, made simple by the availability of large PROMs. The requirement in the particular case is 2K by 8, that is, 11 address inputs and 8 outputs. The block diagram of the complete code generator is shown in FIG. 11. Each of the check words $K_0$ to $K_5$ is generated in the conventional manner using related primitive polynomial generators 40 as described above with reference to FIG. 10. Only the data words are used in this generation process. The output of each primitive polynomial generator 40 addresses a 6-way 8 to 8 code converter in the form of a 2K by 8 PROM 41, the outputs of which are connected to a modulo-2 adder 42. For each check word, one of the 8 to 8 code converter tables is accessed and the check word generated as a modulo-2 sum of all six modified "K" check word values. The check words $K_0$ to $K_5$ so generated are associated with the data block for transmission or recording.

The method of decoding at the decoder could be generally as described above in connection with the method using only two check words, but an improved method of decoding will now be described.

The first operation is to generate six syndromes from the sixty data words and the six check words of each data block. The coding structure described above results in the syndromes being available directly the last word, that is the sixth check word, of each data block is available. The syndromes are referred to as $S_0$, $S_1$, $S_2$, $S_3$, $S_4$, $S_5$.

Figure 12:
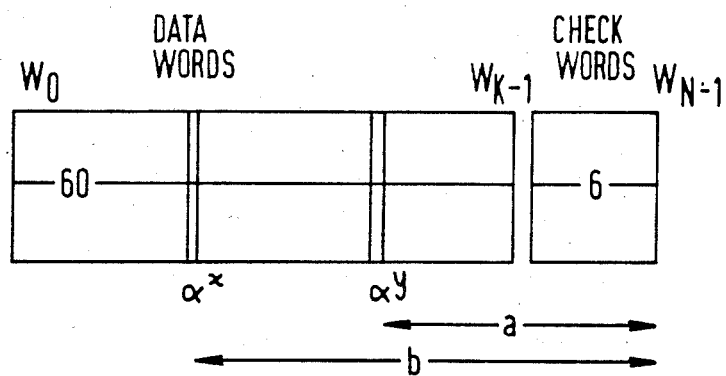
FIG. 12 indicates diagrammatically a still further block of data words with associated check words.

Referring to FIG. 12, assume that two errors of magnitude $\alpha^x$ and $\alpha^y$ occur in the data words and that the error locations are a and b respectively. The syndromes will therefore be:

$$S_0 = \alpha^x \oplus \alpha^y$$

$$S_1 = \alpha^x \cdot \alpha^a \oplus \alpha^y \cdot \alpha^b$$

$$S_2 = \alpha^x \cdot \alpha^{2a} \oplus \alpha^y \cdot \alpha^{2b}$$

$$S_3 = \alpha^x \cdot \alpha^{3a} \oplus \alpha^y \cdot \alpha^{3b}$$

$$S_4 = \alpha^x \cdot \alpha^{4a} \oplus \alpha^y \cdot \alpha^{4b}$$

$$S_5 = \alpha^x \cdot \alpha^{5a} \oplus \alpha^y \cdot \alpha^{5b} \quad (23)$$

As mentioned above, the circuitry required can be simplified by modifying the syndromes to avoid reverse stepping. This modification in effect transfers the syndromes from the end of the code to the beginning, a move of N time slots. Therefore $S_0$ is multiplied by $\alpha^0$, $S_1$ is multiplied by $\alpha^{-N}$, $S_2$ is multiplied by $\alpha^{-2N}$ and so on. The new syndromes $S'_0$ to $S'_5$ are then:

$$S'_0 = \alpha^x \oplus \alpha^y$$

$$S'_1 = \alpha^x \cdot \alpha^a \cdot \alpha^{-N} \oplus \alpha^y \cdot \alpha^b \cdot \alpha^{-N}$$

$$S'_2 = \alpha^x \cdot \alpha^{2a} \cdot \alpha^{-2N} \oplus \alpha^y \cdot \alpha^{2b} \cdot \alpha^{-2N}$$

$$S'_3 = \alpha^x \cdot \alpha^{3a} \cdot \alpha^{-3N} \oplus \alpha^y \cdot \alpha^{3b} \cdot \alpha^{-3N}$$

$$S'_4 = \alpha^x \cdot \alpha^{4a} \cdot \alpha^{-4N} \oplus \alpha^y \cdot \alpha^{4b} \cdot \alpha^{-4N}$$

$$S'_5 = \alpha^x \cdot \alpha^{5a} \cdot \alpha^{-5N} \oplus \alpha^y \cdot \alpha^{5b} \cdot \alpha^{-5N} \quad (24)$$

To locate the error positions a Chien search is done, in which each of the syndromes $S_1$ to $S_5$ is multiplied by $\alpha^1$ and modulo-2 added to the syndromes $S_0$ to $S_4$ respectively. After $(N-a)$ multiplications by $\alpha^1$ the following five equations result:

$$P_0 = \alpha^{N-a} \cdot S'_1 \oplus S'_0$$
$$= \alpha^y \cdot \alpha^b \cdot \alpha^0 (\alpha^{-a} \oplus \alpha^{-b})$$

$$P_1 = \alpha^{N-a} \cdot S'_2 \oplus S'_1$$
$$= \alpha^y \cdot \alpha^{2b} \cdot \alpha^{-N} (\alpha^{-a} \oplus \alpha^{-b})$$

$$P_2 = \alpha^{N-a} \cdot S'_3 \oplus S'_2$$
$$= \alpha^y \cdot \alpha^{3b} \cdot \alpha^{-2N} (\alpha^{-a} \oplus \alpha^{-b})$$

$$P_3 = \alpha^{N-a} \cdot S'_4 \oplus S'_3$$
$$= \alpha^y \cdot \alpha^{4b} \cdot \alpha^{-3N} (\alpha^{-a} \oplus \alpha^{-b})$$

$$P_4 = \alpha^{N-a} \cdot S'_5 \oplus S'_4$$
$$= \alpha^y \cdot \alpha^{5b} \cdot \alpha^{-4N} (\alpha^{-a} \oplus \alpha^{-b})$$

$$(25)$$

Hence:

$$\frac{P_1}{P_0} = \frac{P_2}{P_1} = \frac{P_3}{P_2} = \frac{P_4}{P_3} = \frac{\alpha^b}{\alpha^N} \quad (26)$$

These conditions are checked until one error is found. It should be noted that is there if only one error ($\alpha^x$) and hence $\alpha^y = 0$, then $P_0$, $P_1$, $P_2$, $P_3$ and $P_4$ are all zero and this condition also can readily be detected. Once the first error has been detected at the location a, the magnitude of the error $\alpha^x$ must be determined. This is done by generating the identity:

$$\alpha^{2(N-a)} S'_2 \oplus S'_0 = \alpha^y \cdot \alpha^{2b}(\alpha^{-2a} \oplus \alpha^{-2b}) = Q_0 \quad (27)$$

As:

$$(\alpha^{-a} \oplus \alpha^{-b})^2 = (\alpha^{-2a} \oplus \alpha^{-2b}) \quad (28)$$

Therefore:

$$\frac{P_0^2}{(\alpha^{2(N-a)} \cdot S'_2 \oplus S'_0)} = \alpha^y = \frac{P_0^2}{Q_0} \quad (29)$$

and $$\alpha^x = S'_0 \oplus \frac{P_0^2}{(\alpha^{2(N-a)} \cdot S'_2 \oplus _0)} = S' \oplus \frac{P_0^2}{Q_0} \quad (30)$$

The error $\alpha^x$ is modulo-2 added to the data word at the location a to correct the error. The Chien search is then continued to find the location b, and then the magnitude of the error $e^y$ is determined as described above for the error $e^x$. The error $e^y$ is then modulo-2 added to the data word at the location b to correct the second error.

As described above the error location algorithm (26) requires a division process. This is best achieved using logarithms, and to avoid the subtraction steps of the algorithm (26) can be re-written:

$$P_1^2 = P_0 \cdot P_2$$

$$P_2^2 = P_1 P_3$$

$$P_3^2 = P_2 P_4 \quad (31)$$

In this way simple gating is sufficient to indicate whether during the Chien search an error location has been found.

There are a number of options concerning the manner of using the decoding algorithm described above. In the description which follows it will be assumed that the overall method of decoding, that is including also use of the vertical check words, follows the three-step sequence outlined above. That is, the sequence comprises a first step of using the horizontal check words for correction of two error words and detection to determine if further correction is required, a second step of using the vertical check words for correction of error words where errors still remain from the first stage but not detection of further error words, and a third step of using the horizontal check words for correction of two error words and further detection.

Figure 14:
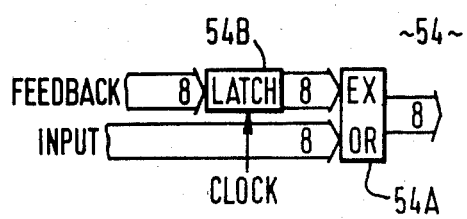
FIG. 14 shows a generator of the decoder of FIG. 13 in more detail.
Figure 15:
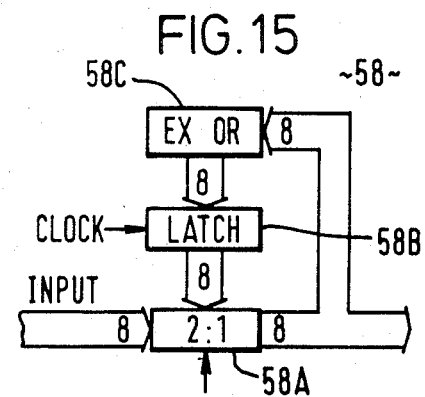
FIG. 15 shows a multiplier of the decoder of FIG. 13 in more detail.
Figure 13A:
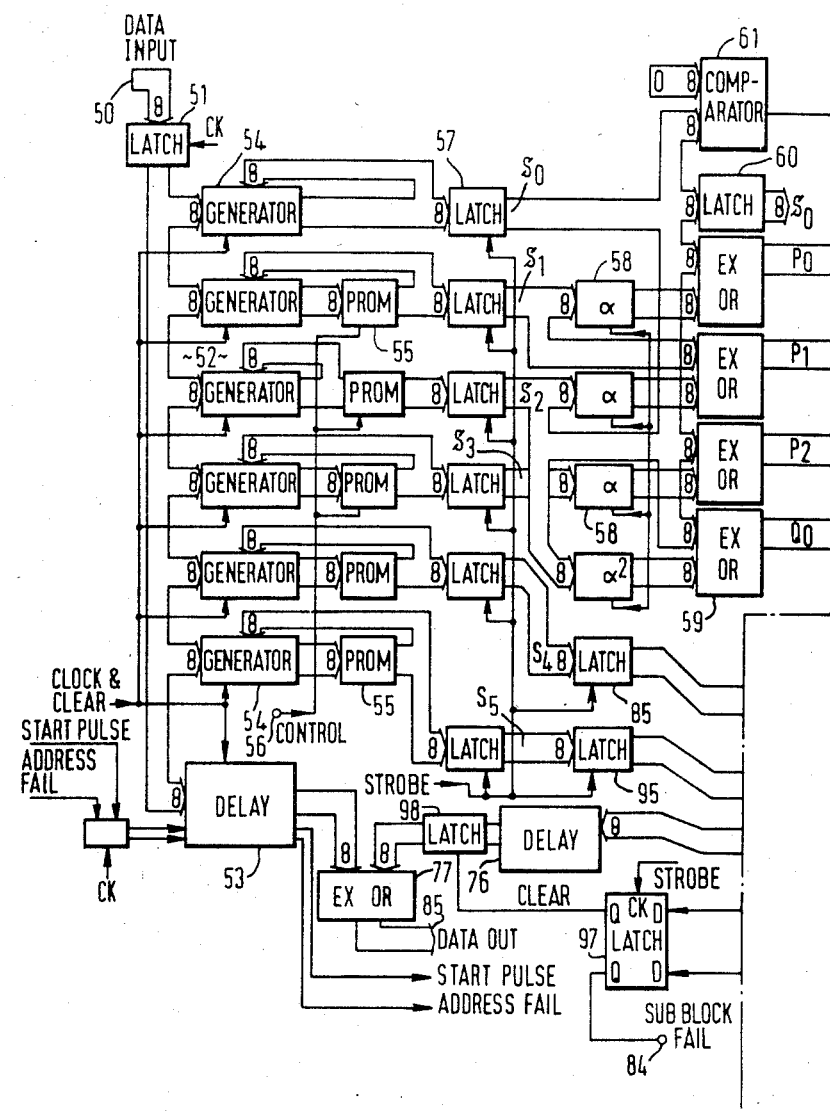
FIGS. 13A and 13B which are drawn on separate sheets due to space limitations, and which together form a single figure referred to as FIG. 13, show in block form part of a decoder.
Figure 13B:
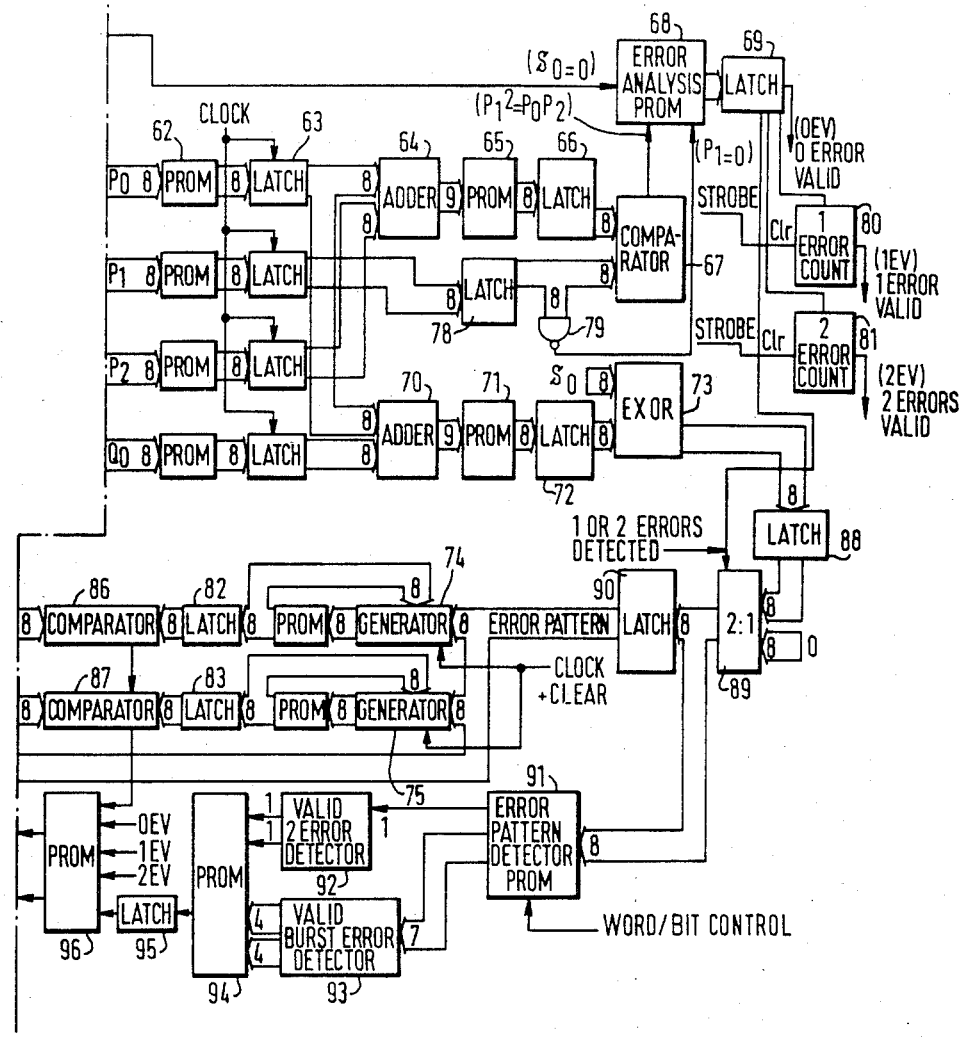

In the third step the full error correcting and detecting capability of the horizontal check words is used, and a method of and apparatus for doing this will be described in detail with reference to FIGS. 13 to 15. From this description it will readily be apparent how the relatively simple first step, which does not use the full capability of the horizontal check words, can be carried out. Error words which are detected but not corrected in the third step are flagged for subsequent concealment.

In the initial double error processing of the horizontal blocks only the first four of equations (23) and (24) may be used, only the first three of equations (25) may be used and only the first part of equation (31) may be used. When two errors have been located and corrected, the two remaining check word generators may be used for further error detection or alternatively to generate two new syndromes, which should be the same as the syndromes generated from the corresponding check words.

An example of apparatus for effecting decoding in this way will now be described referring first to FIG.

13. The reproduced or received data blocks, are supplied by way of a data input 50 to an octal latch circuit 51, the output of which is connected to respective inputs of six primitive polynomial generators 52 and a delay 53. Each of the primitive polynomial generators 52 comprises a generator portion 54 shown in more detail in FIG. 14 and formed by an exclusive-OR circuit 54A and an octal latch circuit 54B. Each of the primitive polynomial generators 52 except the first also comprises a 512×8 PROM 55. A feedback extends from the output of each PROM 55 to a second input of the respective generator portion 54. No PROM 55 is necessary for the first primitive polynomial generator 52, which corresponds to FIG. 9A, except in that the exclusive-OR gates and the shift register stages are reversed in position.

For the reasons mentioned above, and in particular to avoid reverse stepping during the Chien searches, the syndromes generated are modified, and this function also is performed by the PROMs 55. For this purpose control signals are supplied by way of a terminal 56 to the most significant bit terminal of the first three PROMs 55 so that when the primitive polynomial generators 52 have completed generation of the respective syndrome at the receipt of the last word in the data block, the syndrome is then modified and the modified syndrome is supplied to a respective one of six octal latch circuits 57. The octal latch circuits 57 therefore respectively hold the modified syndromes $S'_0$, $S'_1$, $S'_2$ and $S'_3$ and the syndromes $S_4$ and $S_5$ for further processing while the next data block is being supplied to the data input 50.

The expressions $P_0$, $P_1$ and $P_2$ of equations (25) are then derived by multipliers 58 and exclusive-OR circuits 59. For example, the modified syndrome $S'_0$ is supplied directly to one input of the first exclusive-OR circuit 59 and the modified syndrome $S'_1$ is supplied by way of the first multiplier 58 to the other input of the first exclusive-OR circuit 59. Each of the multipliers 58 comprises, as shown in more detail in FIG. 15, an octal 2:1 selector 58A, an octal latch circuit 58B and three exclusive-OR gates forming an exclusive-OR circuit 58C. In the first clock cycle the input (syndrome) data is passed through the 2:1 selector 58. At the end of this clock cycle, the data is multiplied by $\alpha^1$ through the exclusive-OR circuit 58C and held by the octal latch circuit 58B. The 2:1 selector 58A selects the output of the octal latch circuit 58B for the remainder of the data block period, and at each clock cycle the data has been multiplied by $\alpha^1$. The first multiplier 58 multiplies the modified syndrome $S'_1$ by $\alpha^1$, and when this operation has been carried out (N−a) times, the output of the first exclusive-OR circuit 59 is $P_0$ as required by the first of equations (25). Likewise, the second exclusive-OR circuit 59 supplies $P_1$ and the third exclusive-OR circuit 59 supplies $P_2$.

The fourth exclusive-OR circuit 59 supplies a value $Q_0$ used in finding the error magnitude from $\alpha^{2(-N-a)}S'_2 \oplus S'_0$ is equation (27).

The modified syndrome $S'_0$ is also supplied to an octal latch circuit 60 and to a comparator 61 where it is compared with zero to detect zero errors.

The next requirement is to check the first two parts of equation (26), that is:

$$\frac{P_1}{P_0} = \frac{P_2}{P_1} = \frac{\alpha^b}{\alpha^N} \quad (26)$$

This is done by PROMs 62 which provide look-up tables, having in mind that the outputs of the exclusive-OR circuits 59 represent positions on the ring of FIG. 5. The outputs of the PROMs 62 are supplied to inputs of octal latch circuits 63, the outputs of the first and third octal latch circuits 63 being supplied to respective inputs of an adder 64 which supplies an output to a 512×8 PROM 65.

The four PROMs 62 respectively convert two values of $P_0$, $P_1$, $P_2$ and $Q_0$ into log form, in particular log ($P_0$), log ($P_1^2$), log ($P_2$), and log ($Q_0$). The adder 64 sums log ($P_0$) and log ($P_2$). This gives a 9-bit result which is converted back to an 8-bit code by the PROM 65, the result being held in an octal latch circuit 66. Another octal latch circuit 78 holds log ($P_1^2$). The outputs of the octal latch circuits 66 and 78 are supplied to a comparator 67 which supplies an output "1" when they are equal, that is:

$$\log (P_1^2) = \log (P_0) + \log (P_2) \quad (32)$$

An error analysis PROM 68 has three inputs respectively connected to the outputs of the comparators 61 and 67 and of a NAND-gate circuit 79, the input of which is connected to the output of the octal latch circuit 78. The three inputs to the PROM 68 are decoded into four outputs, and the output is held in a latch circuit 69 for controlling subsequent stages. These four outputs represent:

(i) no error in the data block
(ii) one only error in the data block
(iii) two only errors in the data block
(iv) one or two errors in the data block.

Output (i) representing no error in the data block is supplied to one input address of a 32×2 PROM 96.

Output (ii) representing one error in the data block is latched into a counter 80. The counter 80 detects that only one pulse of output (ii) is present in any data block. Should there be zero or more than one single decoded error in the data block then single error correction is inhibited by the PROM 96.

Output (iii) representing two errors in the data block is latched into a counter 81. Similar to the one error case, two and only two errors must be decoded in each data block. If any other condition is detected, then double error correction is inhibited by the PROM 96.

Output (iv) is used to control a 2:1 selector 89 which, if an error is detected, switches through the data from an octal latch circuit 88. If no error is detected, then the 2:1 selector 89 supplies zero data.

Further inputs to the error analysis PROM 68 can be used to control whether the arrangement decodes single or double errors or neither.

The error pattern is generated by an adder 70 the output of which represents the log value of equation (29). A PROM 71 derives the antilog and the result ($\alpha^y$) is held in an octal latch circuit 72. The value of equation (30), ($\alpha^x$) is derived by an exclusive-OR circuit 73 and held in the octal latch circit 88. If there are no errors, then the data held in the octal latch circuit 72, the modified syndrome $S'_0$ and the output of the exclusive-OR gate 73 will be zero. If there is one error only, then the data held in the octal latch circuit 72 will be zero and the modified syndrome $S'_0$ will have a magnitude equal to the error. Hence the error pattern will be available on the output of the exclusive-OR gate 73. The error pattern held in the octal latch circuit 88 is supplied to the 2:1 selector 89. If one or two error positions are decoded, then the error pattern is passed through to an octal latch circuit 90 and to an error pattern detector PROM 91.

The output of the octal latch circuit 90 is passed to a delay 76 for storage, and to syndrome generators 74 and 75. The syndrome generators 74 and 75 generate, in the same manner as the primitive polynomial generators 52, the values of two syndromes $S'_4$ and $S'_5$ and at the end of the data block these values are held in octal latch circuits 82 and 83. If the error pattern is valid, then the syndromes $S'_4$ and $S'_5$ will be equal to $S_4$ and $S_5$ respectively. This condition is detected by comparators 86 and 87 respectively. The output from the comparator 86 is used to enable the comparator 87, and hence the output of the comparator 87 represents the equality of both syndrome pairs. This output is used to control the PROM 96.

The error pattern from the 2:1 selector 89 is also supplied to the error pattern detector PROM 91 together with a word/bit control. When this control is in the word state, then the PROM 91 decodes every data pattern as valid via a valid two-error detector 92 and a 1K×1 PROM 94. If the control is in the bit state, then the input to the valid two-error detector 92 is valid only if a single bit error is decoded in the error word. Also, the input to a valid burst error detector 93 is valid if only two sequential error words are representative of a 9-bit or less error pattern. The results of these tests are supplied to the PROM 94 which decodes the valid error patterns and supplies a control signal via a latch circuit 95 to the PROM 96.

The inputs to the PROM 96 enable zero, single and two-error patterns to be decoded and enable, via a latch circuit 97, the output of an octal latch circuit 98 to correct the errors in the data via an exclusive-OR gate 77 to which the data is also supplied from the delay 53.

A second output from the PROM 96 via the latch circuit 97 is used to supply a signal to an output 84 to indicate that an uncorrectable error pattern has been found, and this is then used for subsequent error correction or error concealment processes.

To summarise, therefore, if there are no errors the 2:1 selector 89 will select the all "0" signal. If there is a single error, then the PROM 71 will effectively be disabled and the output of the exclusive-OR circuit 73 will be the modified syndrome $S'_0$. If, however, there are two errors the PROM 71 will be operative and the magnitudes of the errors will be found as described above. In all cases, therefore, the output of the 2:1 selector 89 will be the error pattern, although in cases where there are no errors, the error pattern will be all "0". The error pattern is supplied to the delay 76 and thence to one input of the exclusive-OR circuit 77 to be modulo-2 added to the data which is supplied to the other input of the exclusive-OR circuit 77 from the delay 53. In this way the errors in the data are corrected and the corrected data is supplied to an output 85.

Additionally, for checking purposes, the error pattern from the 2:1 selector 89 may be supplied to the syndrome generators 74 and 75. The check is effected making use of the latter part of equation (26). Briefly, the fifth and sixth primitive polynomial generators 52 generate the syndromes $S_4$ and $S_5$ and they are supplied by way of the fifth and sixth latch circuits 57 and the octal latch circuits 85 and 95 to the comparators 86 and 87. A simple comparison in each of the comparators 86 and 87 is all that is necessary. If the error pattern which has been derived as described above and which is supplied to the syndrome generators 74 and 75 is the same as the error pattern in the original data, then the syndromes $S_4$ and $S_5$ supplied to the comparators 86 and 87 respectively from the fifth primitive polynomial generator 52 and the syndrome generator 74, and from the sixth polynomial generator 52 and the syndrome generator 75 will be the same, and an "error valid" signal will be supplied from the comparator 87 to the PROM 96.

There are a number of options available at this point. For example, the error-corrected data can be allowed through, it being accepted that the error detection may fail if there are more than five errors in the block. This may give a failure rate of about 1 in $10^6$ and this may well not be acceptable. To improve the failure rate to about 1 in $10^9$ some additional protection is provided, as will now be described.

This is done by restricting the individual error corrections that are applied to any 9-bit burst pattern or any 2-bit random error pattern. This is done after detecting a single error or a double error pattern. Any single word error pattern is within the above criteria because any 8-bit word is within a 9-bit burst (the converse is not true). This is detected by the error pattern detector PROM 91 which checks each error pattern.

Each time there is a double error pattern located it is analysed by the error pattern detector PROM 91. The PROM 91 is an 8-to-7 code converter, the top bit indicating the presence of a non-zero input pattern, the next three bits of the output indicating in binary coded decimal the distance of the first error bit from the end of the first word and the bottom three bits of the output indicating in binary coded decimal the distance of the second error bit from the beginning of the second word. These binary coded decimal values are supplied by the latch circuit 95 to the PROM 96. Only therefore if one of the criteria mentioned above is satisfied will the delay 76 be enabled to use the error patterns which have been derived to correct the data, by supplying them to the exclusive-OR circuit 77. If neither criteria is satisfied it is assumed that the errors cannot be corrected and the data is passed uncorrected and is flagged as being in error for subsequent error correction or concealment processes. Likewise if the syndromes were non-zero, but no error pattern is found in the data block, it is again assumed that there are errors which cannot be corrected, and so the whole data block is flagged for additional error correction or concealment.

It will be appreciated that the operation is the same whether the errors are in the data words or in the check words, and no special processing is required to determine whether the errors are in the check words or the data words.

Consideration will now be given to the generation of the vertical check blocks and the use of the vertical check words therein in the decoding sequence.

Figure 16:
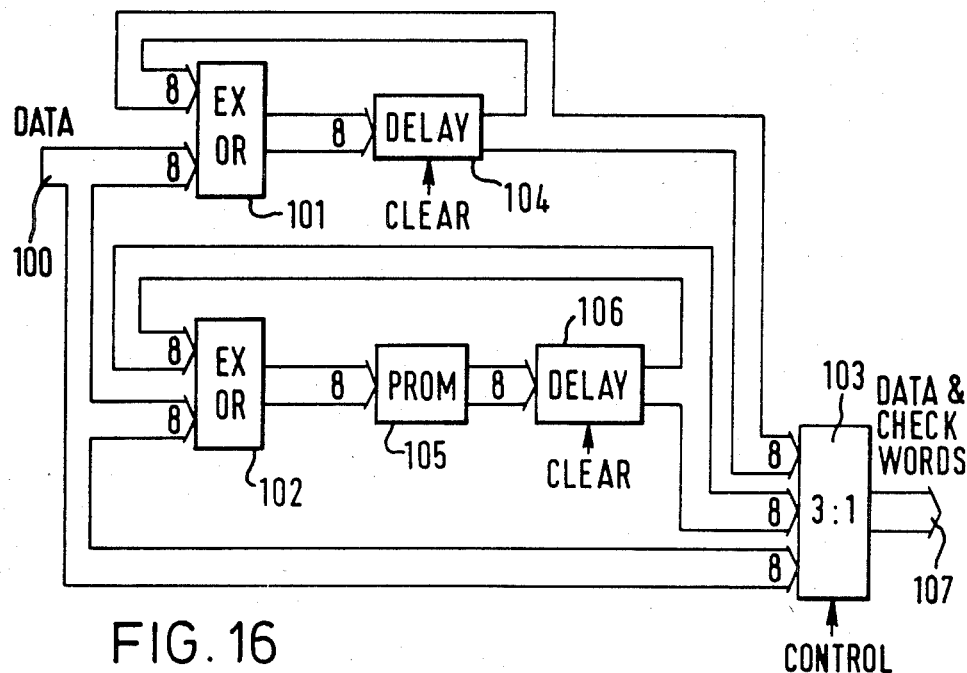
FIG. 16 shows in block form a circuit for generating vertical check words in an encoder.

FIG. 16 shows in block form one type of circuit for generating vertical check words in the encoder. The input data is supplied to an input 100 which is connected to respective first inputs of two exclusive-OR circuits 101 and 102, and to a first input of a 3:1 selector 103. The output of the exclusive-OR circuit 101 is connected by way of a delay 104 to a second input of the selector 103, and also by way of the delay 104 back to a second input of the exclusive-OR circuit 101. The output of the exclusive-OR circuit 102 is connected by way of a PROM 105 and a delay 106 in series to a third input of the selector 103, and also by way of the PROM 105 and the delay 106 back to a second input of the exclusive-OR circuit 102. Respective clear signals are supplied to the delays 104 and 106, each of which has a delay corresponding to one row of an m×n array (FIG. 1), and a control signal is supplied to the selector 103. The output data with the vertical check words is supplied by the selector 103 to an output 107.

In operation, the data is supplied in pre-formatted form to the input 100. That is to say, the data is grouped in sets of thirty-four rows (FIG. 1) with gaps to receive the thirty-fifth and thirty-sixth rows of the m×n arrays, these last two rows consisting of the vertical check words. The vertical check words in the thirty-fifth row are simple parity check words formed by modulo-2 addition of the vertically aligned data words of the first thirty-four rows of the m×n array in the exclusive-OR circuit 101. The delay 104 is then cleared ready to start receiving data words from the next m×n array.

The vertical check words in the thirty-sixth row are formed by modulo-2 addition of the vertically aligned data words of the first thirty-four rows of the m×n array in the exclusive-OR circuit 102, followed by successive shifting row by row in the PROM 105, as described above for example in connection with FIG. 5, to form a Reed-Solomon b-adjacent code. The timing of the clear signals is arranged to avoid an unwanted additional shift in the PROM 105 to the time of the thirty-fifth row, that is the parity check word row. The timing of the control signal is such that the output supplied to the output 107 comprises the m×n arrays complete with the generated vertical check blocks.

This generation of the vertical check words is preferably done before the above-described generation of the horizontal check words, but this is not essential.

The use of these vertical check words in the second step of the three-step sequence outlined above will now be described. It will be apparent from the above description relating to the horizontal check words that the respective vertical check words in the thirty-fifth and thirty-sixth rows of an m×n array can be used to correct a single error word among the thirty-four data words vertically aligned with those check words. Thus in a decoder, the two vertical check words can be used, with the data words, to generate first and second syndromes $S_0$ and $S_1$ which represent the magnitude and, by successive shifting as described above also the position, of an error word.

Figure 17:
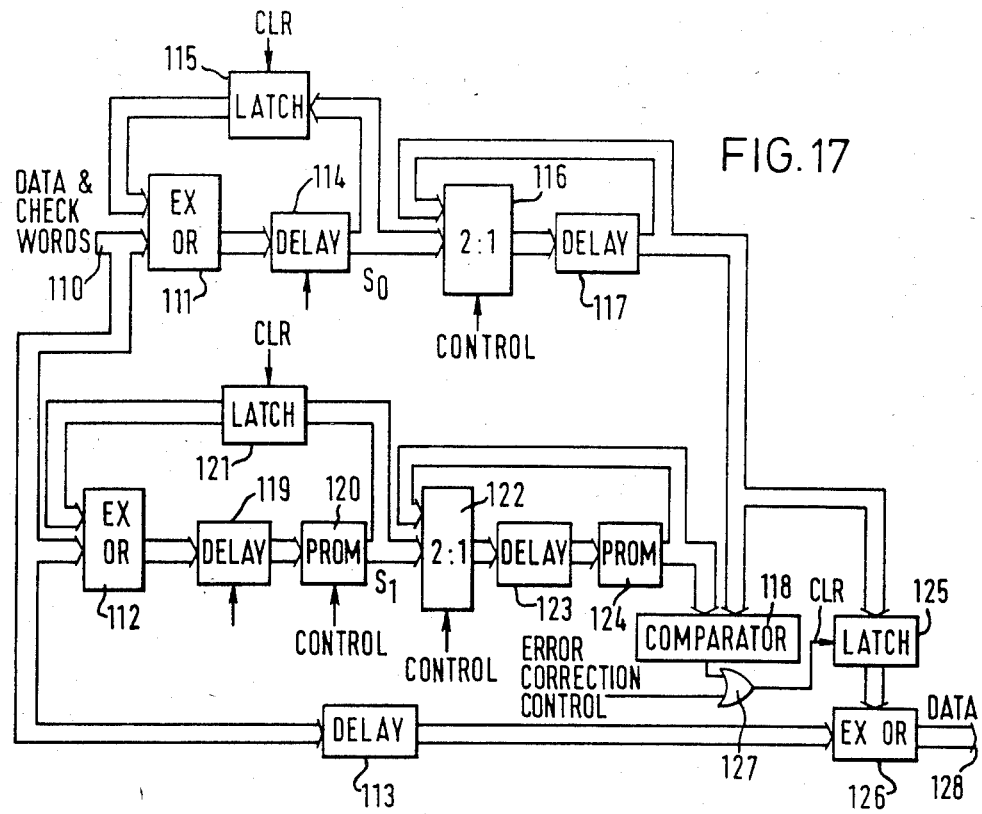
FIG. 17 shows in block form another part of a decoder.

FIG. 17 shows in block form one type of circuit for effecting this error correction on decoding. The input data with the vertical check words is supplied to an input 110 which is connected to a first input of an exclusive-OR circuit 111, to a first input of an exclusive-OR circuit 112, and to the input of a delay 113. The output of the exclusive-OR circuit 111 is connected by way of a delay 114 to a latch circuit 115 and so back to a second input of the exclusive-OR circuit 111. The syndrome $S_0$ is developed at the output of the delay 114 and is supplied to one input of a 2:1 selector 116, the output of which is connected by way of a delay 117 back to a second input of the selector 116. The output of the delay 117 is also connected to one input of a comparator 118 so that a Chien search can be performed.

The output of the exclusive-OR circuit 112 is connected by way of a delay 119 and a PROM 120 in series to a latch circuit 121 and so back to a second input of the exclusive-OR circuit 112. The syndrome $S_1$ is developed at the output of the PROM 120, which effects the necessary shifting to generate the syndrome $S_1$, and is supplied to a first input of a 2:1 selector 122, the output of which is connected by way of a delay 123 and a PROM 124 in series to a second input of the comparator 118 and also back to a second input of the selector 122. The PROM 120 does the stepping back as described above to avoid reverse stepping in the Chien search.

The output of the delay 117 is also connected by way of a latch circuit 125 to a first input of an exclusive-OR circuit 126. The output of the comparator 118 is connected by way of one input of a gate 127 to a clear terminal of the latch circuit 125. The gate 127 has another input to which an error correction control signal can be supplied. This error correction control signal may be used to disable the gate 127, for example, if the first step of the correction sequence reveals no errors. This is done because the horizontal check words provide the most accurate check on error words, and if they reveal none it is best to prevent error correction using the vertical check words as this may well result in erroneous correction. The output of the delay 113 is connected to a second input of the exclusive-OR circuit 126, the output of which is connected to an output 128. The delays 114, 117, 119 and 123 each have a delay corresponding to one row of an m×n array (FIG. 1), and the delay 113 has a delay corresponding to a complete m×n array.

In operation, to perform the Chien search, the syndromes $S_0$ and $S_1$ are generated and the PROM 124 shifts the syndrome $S_1$ row by row until the comparator 118 detects the identity that indicates that the position of the error word has been found. Thereupon the gate 127 enables the latch circuit 125 to supply the syndrome $S_0$ to the exclusive-OR circuit 126 for modulo-2 addition to the error word to effect correction.

An alternative method of decoding will now be described. In this method, in the first step of the sequence the horizontal check words are used to correct up to two error words in each data block. Error flags are added to blocks in which more than two error words are detected. Then, in the second step of the sequence, the vertical check words are used to effect correction of up to two data blocks in each column of the array.

Figure 18:
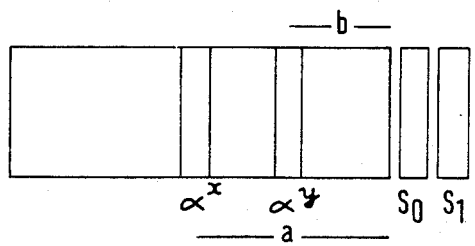
FIG. 18 indicates diagrammatically a block of data words with associated syndromes.

FIG. 18 shows a block of data words containing flagged error words $\alpha^x$ and $\alpha^y$ positioned a and b data words from the end of the data block, and the syndromes $S_0$ and $S_1$ These data words are assembled from one word of each block in any column of the array. Then:

$$S_0 = \alpha^x \oplus \alpha^y \tag{33}$$

and $$S_1 = \alpha^x \alpha^a \oplus \alpha^y \alpha^b \tag{34}$$

But since a and b are known from the horizontal error detection process, $\alpha^a$ and $\alpha^b$ are known, so $\alpha^x$ and $\alpha^y$ can be deduced as follows: From equation (33):

$$\alpha^b S_0 = \alpha^b \alpha^x \oplus \alpha^b \alpha^y \tag{35}$$

Then modulo-2 addition of equations (34) and (35) gives:

$$\alpha^x = S_1 \left( \frac{1}{\alpha^a \oplus \alpha^b} \right) \oplus S_0 \left( \frac{\alpha^b}{\alpha^a \oplus \alpha^b} \right) \quad (36)$$

and in a similar manner:

$$\alpha^y = S_1 \left( \frac{1}{\alpha^a \oplus \alpha^b} \right) \oplus S_0 \left( \frac{\alpha^a}{\alpha^a \oplus \alpha^b} \right) \quad (37)$$

Figure 19:
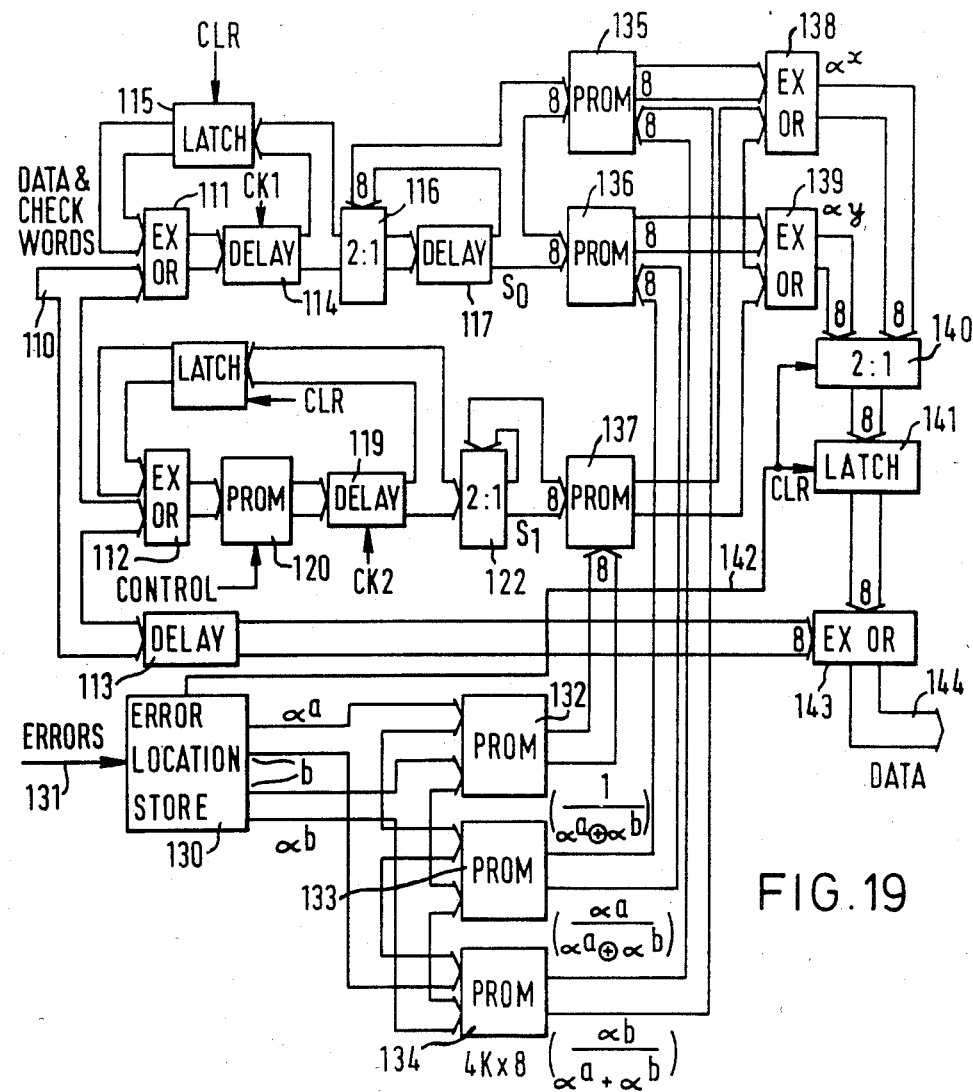
FIG. 19 shows in block form an alternative to the part of the decoder shown in FIG. 17.

FIG. 19 shows in block form a circuit for effecting this error correction on decoding. Parts of the circuit are similar in form and operation as corresponding parts in the circuit of FIG. 17, and these parts are designed by the same reference numerals as in FIG. 17 and will not be further described in detail.

This circuit further comprises an error location store 130 to which error location signals are supplied by way of an error input 131 and converted, for example by a counter to 6-bit error addresses. These error addresses are supplied to three PROMs 132, 133 and 134 which respectively derive the factors:

$$\left( \frac{1}{\alpha^a \oplus \alpha^b} \right), \left( \frac{\alpha^a}{\alpha^a \oplus \alpha^b} \right) \text{ and } \left( \frac{\alpha^b}{\alpha^a \oplus \alpha^b} \right)$$

of equations (36) and (37). These factors are respectively supplied to three further PROMs 135, 136 and 137. Also supplied to the PROMs 135 and 136 is the syndrome $S_0$ and to the PROM 137 is supplied the syndrome $S_1$.

The output of the PROM 135 is connected to a first input of an exclusive-OR circuit 138, the output of the PROM 136 is connected to a first input of an exclusive-OR circuit 139, and the output of the PROM 137 is connected to second inputs of the exclusive-OR circuits 138 and 139. The outputs of the exclusive-OR circuits 138 and 139 are connected to a 2:1 selector 140, the output of which is connected to a latch circuit 141 which is controlled by a signal supplied over a line 142 from the error location store 130. The output of the latch circuit 141 is connected to one input of an exclusive-OR circuit 143 to a second input of which the data is supplied from the delay 113. The output of the exclusive-OR circuit 143 is connected to an output 144 of the circuit from which the corrected data is derived.

In operation the PROMs 135, 136 and 137 derive respective terms of the right-hand sides of equations (36) and (37), this being done either by multiplication of the various factors or by a log technique similar to that described in connection with the circuit of FIG. 13. The exclusive-OR circuits 138 and 139 then form the required values $\alpha^x$ and $\alpha^y$ for supply to the exclusive-OR circuit 143 under control of the latch 141 to be modulo-2 added to the respective error words to effect correction thereof.

When the vertical check words are used as described with reference to FIG. 17, the corrected data will, after use of the above three-step sequence, be supplied back to the part of the decoder shown in FIG. 13 for further error correction and detection. Any remaining errors detected but not corrected with then be flagged as being in error, and subsequently be concealed. Alternatively, with the method outlined in FIG. 19, a two step sequence is more appropriate, in which case, any blocks not corrected at the second stage will then be flagged as being in error and subsequently concealed.

Although the methods and apparatus described are particularly advantageous when applied to digital television signals, there may be circumstances in which they can be applied to other forms of data. In particular they can be applied to audio data in digital form, whether or not forming part of a digital television signal. For audio data 16-bit data words will normally be used, and each of these will be split into two 8-bit words for processing. When forming part of a digital television signal the audio data words will be formed into separate arrays, similar in form to the m×n arrays of video data words described above, but smaller due in particular to the lower data rate of the audio information. In such a case the audio data will normally be in 16-bit word form and by dividing each 16-bit word into two 8-bit words processing as described above can be used.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of correcting errors in binary data, the method comprising:

forming a first plurality of data words;

deriving each of a second plurality of check words in dependence on all of said data words and on each of the other check words of said plurality of check words;

assembling said data words and check words into a data block;

repeating the previous step to form a plurality of data blocks, each said data block comprising a first plurality of data words and a second plurality of check words, each said check word being derived in dependence on all said data words in said data block and each other said check word in said data block; and further assembling said data blocks into an array consisting of a plurality of said data blocks and deriving first and second check blocks for each said array.

2. A method according to claim 1 comprising the further steps, performed after transmission and reception or recording and reproduction of said binary data, of using said check words in a first correction step to detect and to correct errors in said data words and said check words and using said first and second check blocks in a second correction step to detect and to correct further errors in said data words.

3. A method according to claim 2 further comprising the step of using said check words in a third correction step to detect and to correct still further errors in said data words.

4. A method according to claim 2 comprising the step of deriving one of said check words in each said second plurality of check words by modulo-2 addition and deriving each of the remaining said check words in each said second plurality of check words by a respective primitive polynominal generator each using a respective function of the extension field of a common generator polynomial.

5. A method according to claim 4 wherein said binary data represents a digital television signal and comprising the steps of deriving said first check block by modulo-2 addition of a plurality of said first blocks, said first blocks respectively belonging to active picture elements of a digital television signal, and deriving said second check block by a primitive polynomial generator.

6. A method according to claim 5 comprising the step of deriving said first and second check blocks by a Reed-Solomon code.

7. A method according to claim 4 wherein said binary data represents an audio signal.

8. A method according to claim 1 comprising the further steps, performed after transmission and reception or recording and reproduction of said binary data, of using said check words in a first correction step to detect and to correct errors in said data words and said check words and using said first and second check blocks in a second correction step to correct further errors in said data words which have been detected by but not corrected by said check words.

9. Apparatus for correcting errors in binary data, the apparatus comprising:
- means for arranging the data into a plurality of data blocks;
- means for forming, within each of said data blocks, a first plurality of data words and a second plurality of check words;
- means for deriving, within each of said data blocks, each of said check words in dependence on all said data words in said data block and each other said check word in said data block; and
- means for assembling said data blocks into an array consisting of a plurality of said data blocks and for deriving first and second check blocks for each said plurality of data blocks.

10. Apparatus according to claim 9 comprising means for deriving one of said check words in each said plurality of check words by modulo-2 addition and each of the remaining check words in each said second plurality of check words by a respective primitive polynominal generator each using a respective function of the extension field of a common generator polynomial.

11. Apparatus according to claim 10 wherein said binary data represents a digital television signal and comprising means for deriving said first check block by modulo-2 addition of a plurality of said first blocks, said first blocks respectively belonging to active picture elements of a digital television signal, and for deriving said second check block by a primitive polynomial generator.

* * * * *